United States Patent
Hamas et al.

(10) Patent No.: US 11,954,838 B2
(45) Date of Patent: Apr. 9, 2024

(54) PROCESSING MAP DATA FOR HUMAN QUALITY CHECK

(71) Applicant: Lyft, Inc., San Francisco, CA (US)

(72) Inventors: Matej Hamas, London (GB); Luca Del Pero, London (GB); Yerzhan Utkelbayev, London (GB)

(73) Assignee: Lyft, Inc., San Francisco, CA (US)

( * ) Notice: Subject to any disclaimer, the term of this patent is extended or adjusted under 35 U.S.C. 154(b) by 952 days.

(21) Appl. No.: 16/731,982

(22) Filed: Dec. 31, 2019

(65) Prior Publication Data
US 2021/0201465 A1    Jul. 1, 2021

(51) Int. Cl.
*G06K 9/00* (2022.01)
*G06T 7/00* (2017.01)

(52) U.S. Cl.
CPC .. *G06T 7/0002* (2013.01); *G06T 2207/30168* (2013.01)

(58) Field of Classification Search
CPC .............. G06T 7/0002; G06T 2207/30168
USPC ..................................................... 382/113
See application file for complete search history.

(56) References Cited

U.S. PATENT DOCUMENTS

| 7,024,307 B2 | 4/2006 | Ito et al. |
|---|---|---|
| 2019/0331505 A1 | 10/2019 | Probst et al. |

FOREIGN PATENT DOCUMENTS

| JP | 2004198997 A | 7/2004 |
|---|---|---|
| JP | 2004205344 A | 7/2004 |
| JP | 2005140582 A | 6/2005 |
| JP | 2006275856 A | 10/2006 |

OTHER PUBLICATIONS

Yue, Yufeng, et al. "Robust submap-based probabilistic inconsistency detection for multi-robot mapping." 2017 European conference on mobile robots (ECMR). IEEE, 2017. (Year: 2017).*
Mena, Juan B., and José A. Malpica. "An automatic method for road extraction in rural and semi-urban areas starting from high resolution satellite imagery." Pattern recognition letters 26.9 (2005): 1201-1220. (Year: 2005).*

(Continued)

*Primary Examiner* — Jonathan S Lee
(74) *Attorney, Agent, or Firm* — Sheppard Mullin Richter & Hampton LLP

(57) ABSTRACT

The present invention relates to the curation of map data. More particularly, the present invention relates to a method for preparing map data to present to a data curator for substantially optimal quality assurance. Further, the present invention relates to a tool for a data curator to verify map data.
According to a first aspect, there is provided a method comprising: generating a plurality of interdependent map portions from a global map; determining, from the plurality of interdependent map portions, at least one interdependent map portion that requires validation; creating at least one group of interdependent map portions, the group of interdependent map portions comprising: the determined at least one interdependent map portion that requires validation; and at least one additional interdependent map portion; and outputting the at least one group of interdependent map portions for validation.

21 Claims, 18 Drawing Sheets

(56) References Cited

OTHER PUBLICATIONS

Duhautbout, Thibaud, Julien Moras, and Julien Marzat. "Distributed 3D TSDF manifold mapping for multi-robot systems." 2019 European Conference on Mobile Robots (ECMR). IEEE, 2019. (Year: 2019).*

Yue, Yufeng, et al. "Multi-Robot Map Fusion Framework using Heterogeneous Sensors." 2019 IEEE International Conference on Cybernetics and Intelligent Systems (CIS) and IEEE Conference on Robotics, Automation and Mechatronics (RAM). IEEE, 2019. (Year: 2019).*

International Patent Application No. PCT/US2020/067377, International Search Report and Written Opinion dated Apr. 27, 2021, 10 pages.

* cited by examiner

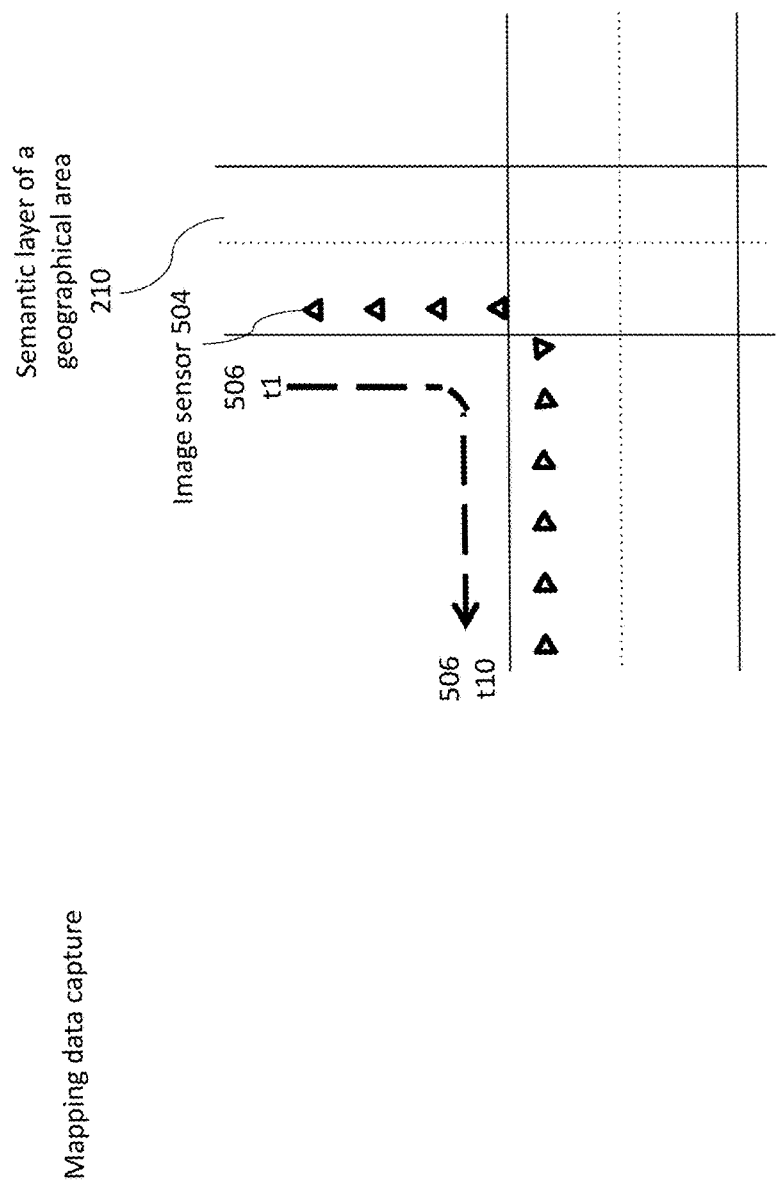

PROCESSING MAP DATA FOR HUMAN QUALITY CHECK

FIELD OF THE INVENTION

The present invention relates to the validation of map data. More particularly, the present invention relates to a method for preparing map data for validation. Further, the present invention provides a tool for a data curator to validate map data.

BACKGROUND

Existing methods for preparing maps are performed manually and are heavily time consuming due to manual validators/curators using trial and error to process the large sections of map data that are presented to them. Generally, for the manual review of map data, large sections of maps are presented to one or more data curators who are then tasked to verify areas of the map section by section. This results in data curators having to spend a substantial amount of unnecessary time on particular areas where no errors are present in those areas, but in contrast for areas that have large numbers of errors, or complex errors, manual verification of these areas that can lack sufficient quality assurance due to the complexity or amount of manual review necessary.

In existing methods, maps are presented without preparation or pre-processing, nor guidance to assist manual curators in the validation process. Due to lack of pre-processing of map data, users are provided with unfiltered data. Also, the lack of map section preparation for data curation results in long hours of manual input, verification, and quality checking needing to be performed by the manual curator. Therefore, it is difficult to ensure quality assurance on large sections of map data that take a long time to review for the same reason.

Additionally, the cleaning process is conventionally carried out by engineers without tools specific to map data curation such as quality check and quality assurance platforms or plug-ins for manual annotation and curation. This leads to inefficiency in the manual curation process as the engineers are tasked with reviewing large sections that cannot be processed quickly and easily, and requires heavily concentrated manual work to process, resulting in inefficient verification.

SUMMARY

Aspects and/or embodiments seek to provide a method of preparing map data to present to a data curator. Other aspects and/or embodiments seek to provide a tool for a data curator to verify map data; and a method of incorporating verified map data into a map.

According to a first aspect, there is provided a method comprising: generating a plurality of interdependent map portions from a global map; determining, from the plurality of interdependent map portions, at least one interdependent map portion that requires validation; creating at least one group of interdependent map portions, the group of interdependent map portions comprising: the determined at least one interdependent map portion that requires validation; and at least one additional interdependent map portion; and outputting the at least one group of interdependent map portions for validation.

According to a second aspect, there is provided a method comprising: receiving at least one group of interdependent map portions, the group of interdependent map portions comprising: at least one interdependent map portion that requires validation; and at least one additional interdependent map portion; displaying the at least one group of interdependent map portions for validation; and receiving one or more validation adjustments to the at least one group of interdependent map portion that requires validation, wherein the one or more validation adjustments are based on an overlap of data between the interdependent map portions of the group.

According to a third aspect, there is provided a method comprising: receiving at least one group of interdependent map portions, wherein the at least one group of interdependent map portions comprises a plurality of interdependent map portions generated from the global map, the group of interdependent map portions comprising: at least one interdependent map portion that requires validation; and at least one additional interdependent map portion; wherein validating the map portions of the at least one group of interdependent map portions is based on an overlap of data between the interdependent map portions of the group; receiving one or more validation adjustments corresponding to the at least one group of interdependent map portions; and updating the global map with the at least one group of interdependent map portions with the validated map portions.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

BRIEF DESCRIPTION OF DRAWINGS

Embodiments will now be described, by way of example only and with reference to the accompanying drawings having like-reference numerals, in which:

FIGS. 5A-5D show overhead views of a semantic layer depicting an example sequence of image captures over example vehicle trajectories that can be used to create map portions or validate map data;

Figure 1:
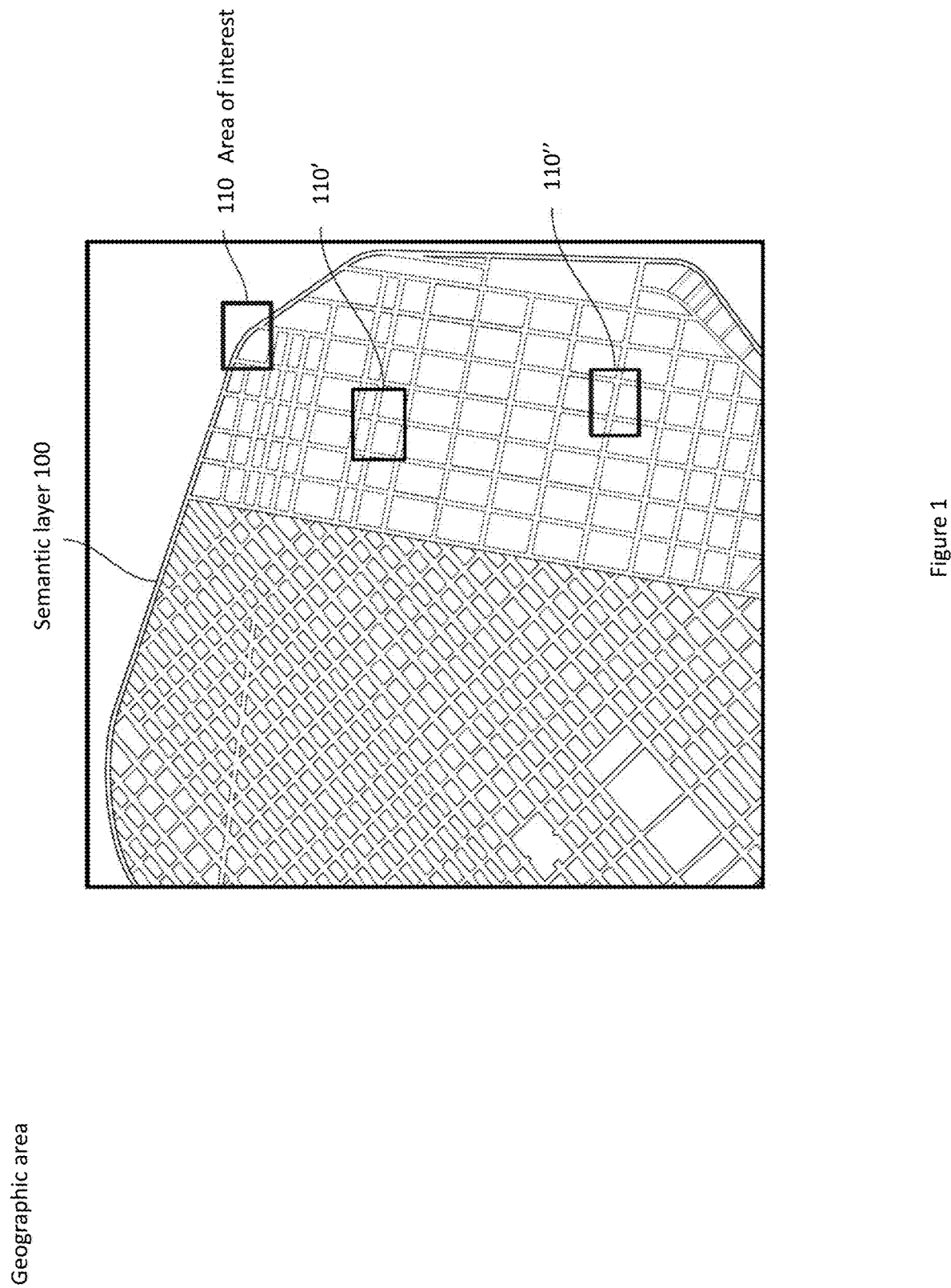
FIG. 1 shows a typical top down view of a map of a geographical area the portions of the map highlighted.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Referring to FIGS. 1 to 15, example embodiments relating to a method for preparing map data for data curation will now be described. More particularly, example embodiments provide a method for efficiently segmenting the global map and creating a combination of map portions into units which are prepared and then presented to a data curator as self-contained compartmentalised tasks which can be completed more effectively and in parallel by multiple data curators.

FIG. 1 shows an illustration of a top down view of a geographical area represented by a map 100. Although images that can be used to create a map can be captured using aerial photography or satellite images, multiple independent vehicles are used in the described embodiments, each generating independent sequences of image data can therefore generate sufficient sets of sequences of image data for combination into a more robust three-dimensional map. Three-dimensional visual maps that are suitable for the comprehensive understanding of mapped environments can be built using data captured by vehicles equipped with camera(s), or other image sensors, capturing sequences of image data or recording video segments which are then converted to sequences of image data captured at sections or segments 110 110' 110" of the wider geographical area.

Figure 2:
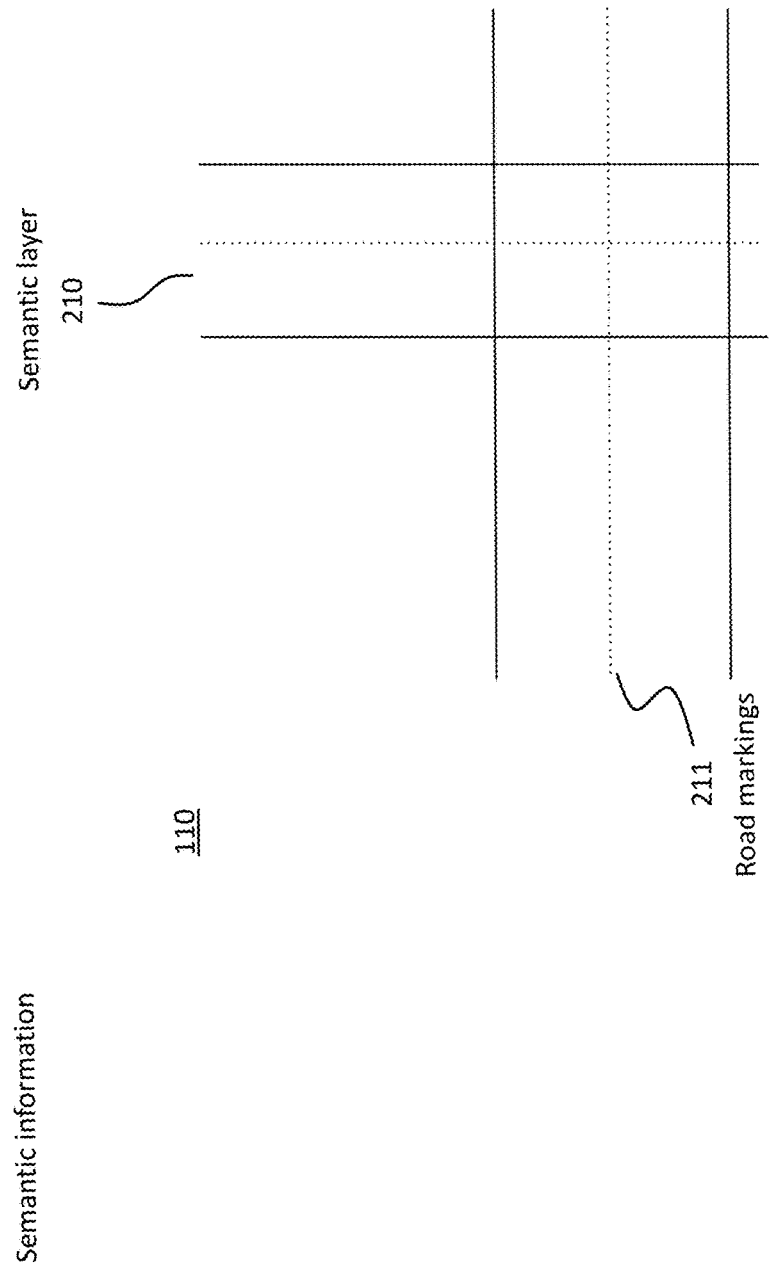
FIG. 2 shows a more detailed view of one of the highlighted portions of the map of FIG. 1, shown here as a semantic layer of the map.

Portions of the map have been highlighted 110, for example these highlighted sections might need verification/curation and one of these highlighted sections is shown in FIG. 2 as a semantic layer of the map, showing a geographical area 210 and road markings 211. For the purposes of manual map data curation, semantic layers can be particularly useful to assist manual curators in identifying errors or making corrections as part of a review process.

Figure 3:
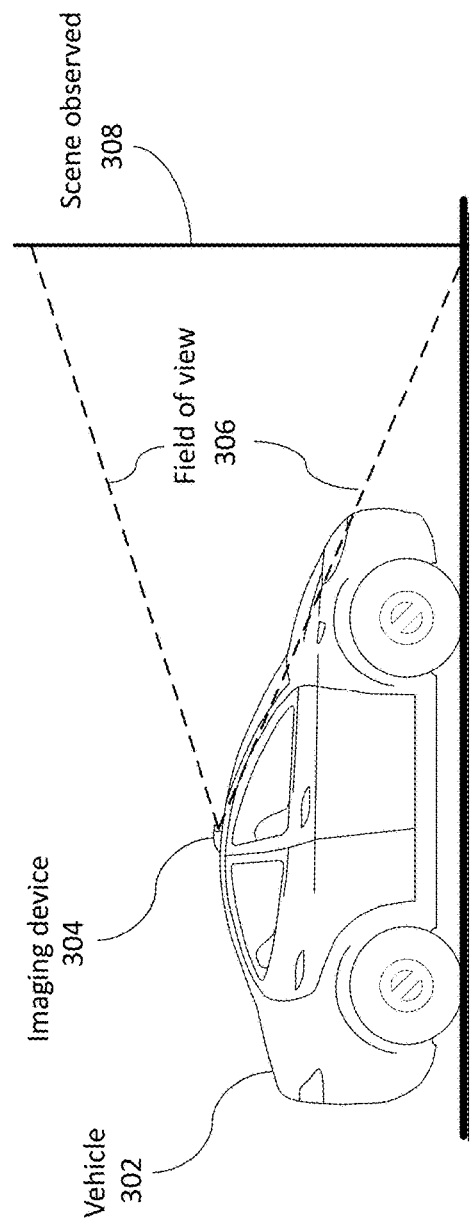
FIG. 3 shows a side view of an example vehicle used to obtain new mapping data.

FIG. 3 demonstrates an example of a vehicle for obtaining image data for map generation. In particular, FIG. 3 depicts the example vehicle 302 as a side view for simplicity. In this embodiment, the vehicle 302 has mounted upon it an imaging device 304 such as a video camera. Although the imaging device 304 is positioned on top of the transportation vehicle 302, the imaging device 304 may alternatively be internal to the transportation vehicle 302 or mounted elsewhere on the vehicle. The field of view of the imaging device 306, sometimes known as the angle of view, can vary depending on the placement of the imaging device 304 on or in the transportation vehicle 302. The scene 108 observed by the imaging device 304 can be represented by the vertical plane 308. The scene observed 308 when captured as an image is represented as a two-dimensional view, as a photograph, however it is possible to re-construct three-dimensional views from a sequence of captured images to generate a three-dimensional map.

In example embodiments, a field of view 306 and the scene observed 308 can be used to represent a pose of the camera 304 at the positions of each image capture. The poses have a centre, representing the camera's position, and details of the scene observed 308 which represents the image the camera captured and the direction the camera was facing (and the field of view of the camera 304 when each image is captured).

Figure 4:
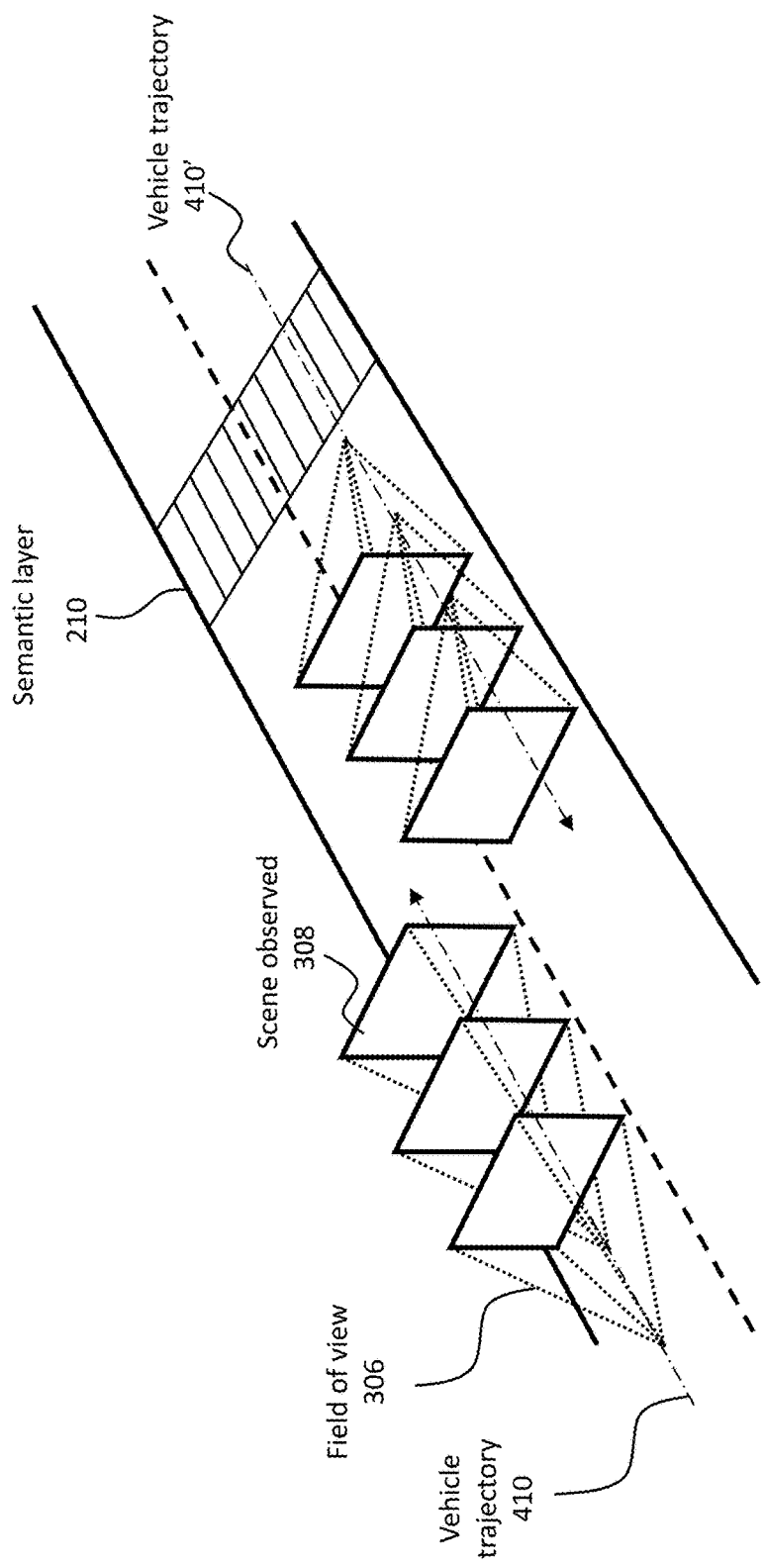
FIG. 4 shows a perspective view of two example collects of new mapping data, showing the field of view frustums and associated image captures over vehicle trajectories, along which the collects are captured.

FIG. 4 depicts a perspective view of two different sequences of image captures (or "collects") having a sequence of scenes observed 308 over two different example vehicle trajectories 410 410', over laid on the semantic layer of the map. In example embodiments, the new mapping data is represented by a collection of frustums, which are grouped together for each map portion. The mapping data for each map portion can be shown as a visual representation of the vehicle's trajectory during its journey, made up of the sequences of camera poses, shown as frustums. In example embodiments, sequential image data captured using ground vehicles can be grouped and used to generate a robust and scalable map from map portions created from each group of mapping data. Also, in example embodiments, the created map portions can be connected and aligned together to create a "global" map.

Figure 5B:
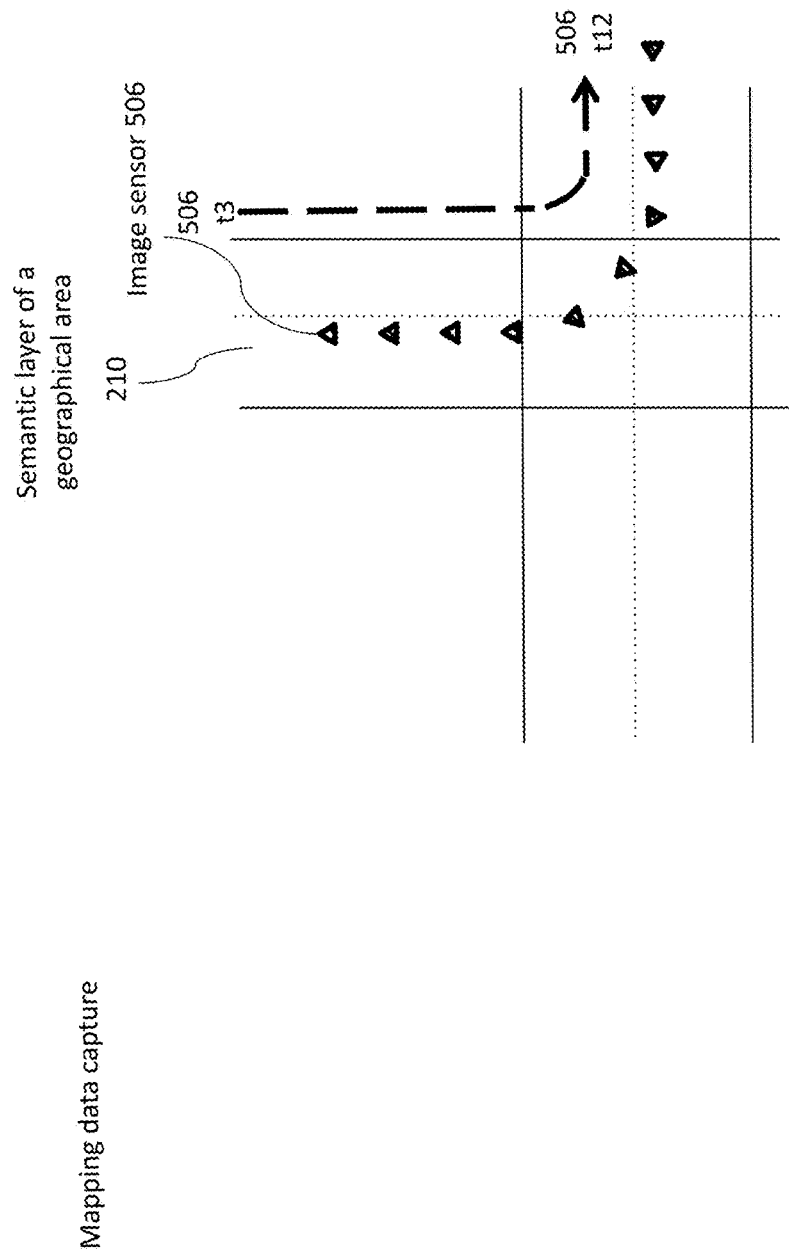
Figure 5C:
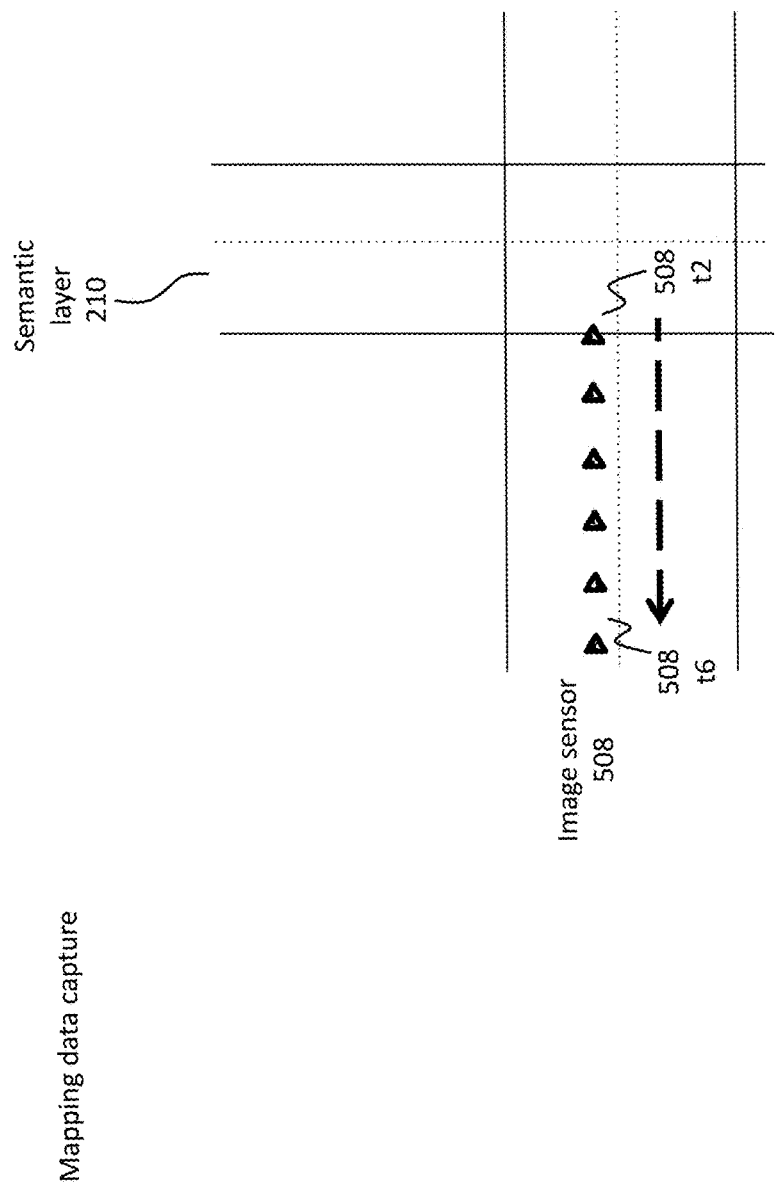
Figure 5D:
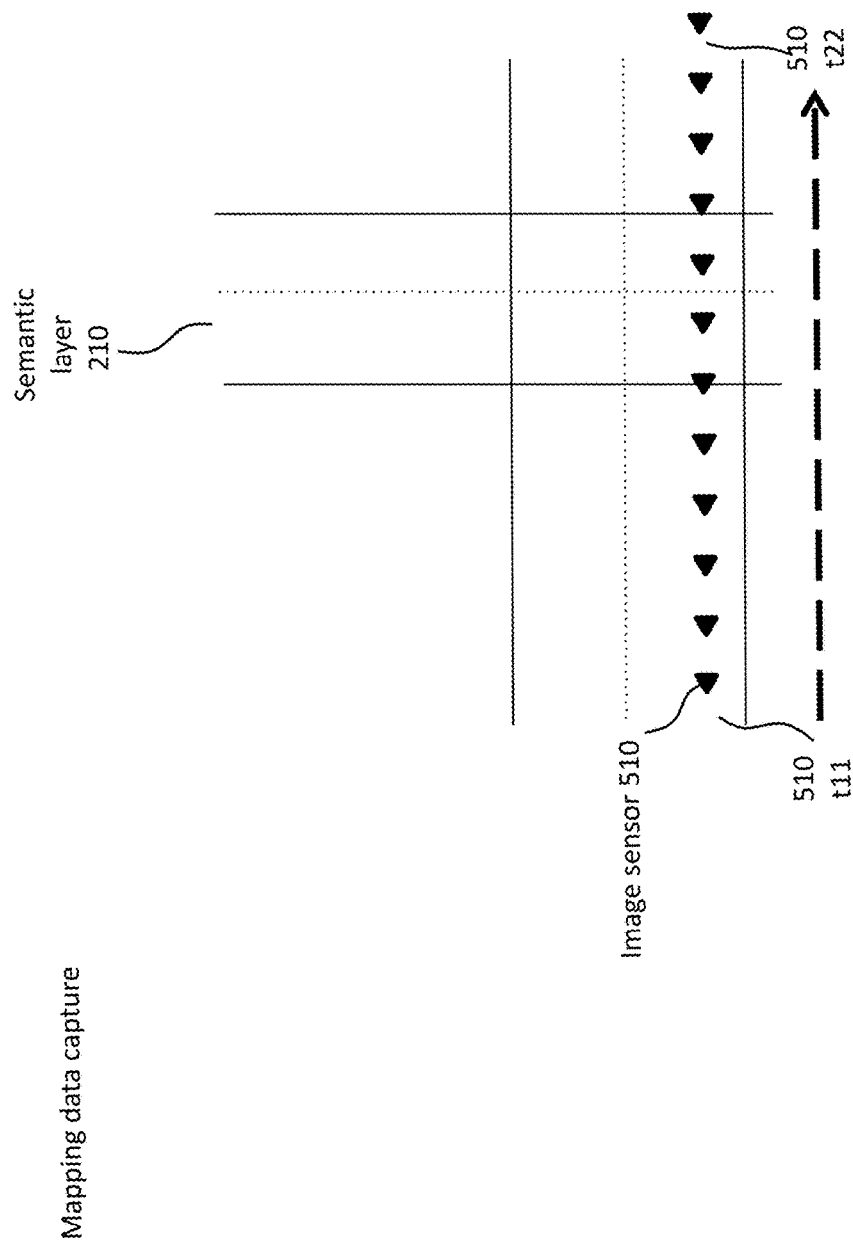

FIGS. 5A to 5D illustrate top down views of the semantic layer of the geographical area 210 and an example sequence of image captures over varying trajectories that can be used to determine map portions or validate map data. FIG. 5A shows an example vehicle trajectory spanning 504 t1 to 504 t10 captured by an image sensor 504. FIGS. 5B, 5C and 5D respectively illustrate example vehicle trajectories spanning 506 t3 to 506 t12 captured by an image sensor 506, 508 t2 to 508 t6 captured by an image sensor 508, and 510 t11 to 510 t22 captured by an image sensor 510. In example embodiments, as new image data is obtained by the same and/or different traversing vehicles, the new image data can also be incorporated and combined with existing image data and be further processed to be verified by a manual curator.

Figure 6:
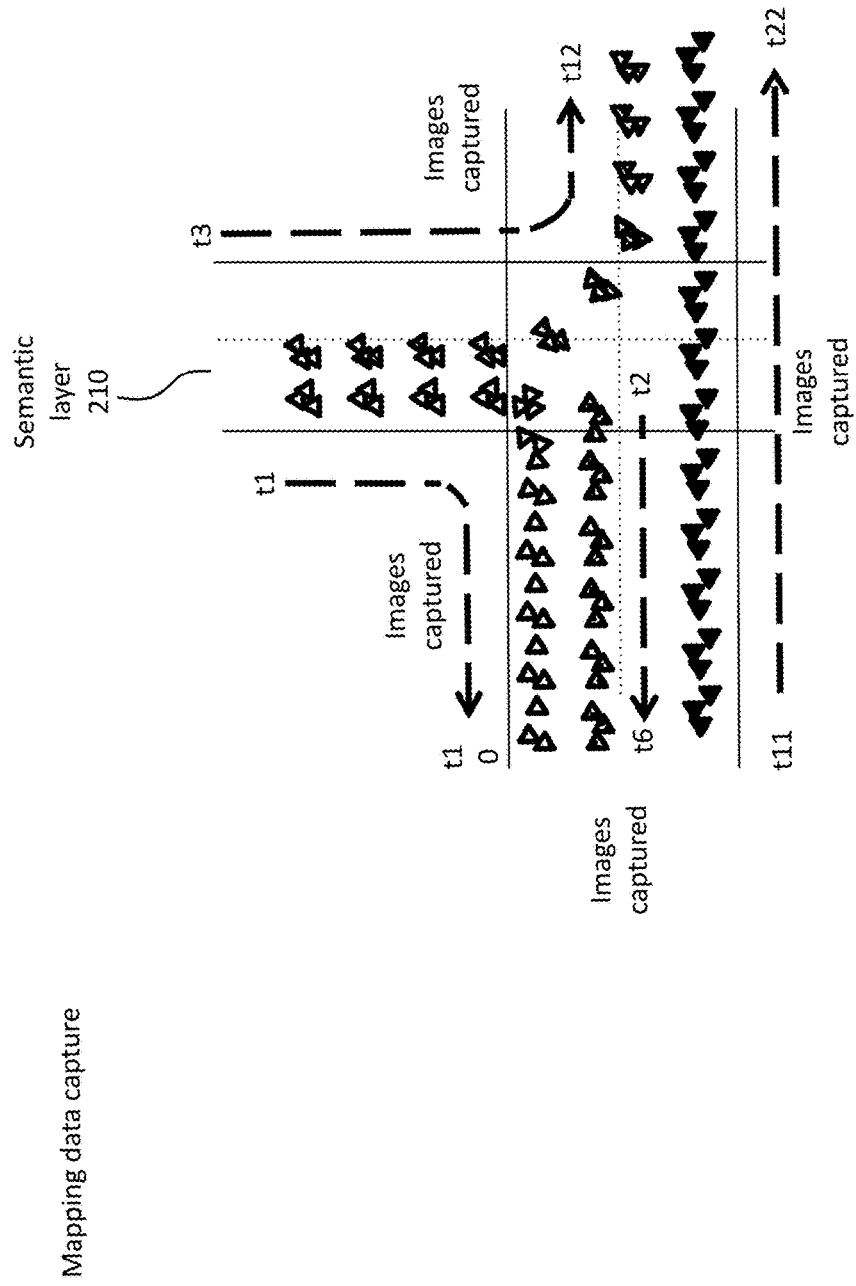
FIG. 6 illustrates a top down view of a semantic layer depicting multiple trajectories, where the data from the multiple trajectories is combined to provide data for more accurate map portion generation as well as map validation.

In example embodiments, the multiple trajectories of vehicles capturing image data can be used to create a complex source of map generation data. As shown in FIG. 6, which shows a top down view of the semantic layer depicting multiple trajectories, the trajectories provide data for more accurate map portion generation as well as map validation due to being a large dataset, and can be used to determine the contextual and geographical complexity of the area. In some example embodiments, the map generation system has prior knowledge of the world, such as the knowledge of road names or landmarks etc. in order to "guide" the alignment of map portions for pre-processing of maps. Thus, a sufficiently large amounts of image data is captured over different trajectories in order to extract context for the geographical area.

As shown in FIG. 6, images captured between t1 and t10, t3 and t12, t2 and t6, and t11 and t22 can be combined to determine similarities among images, and the images can be grouped together to form map portions or groups for each geographical section of a map. Multiple overlapping trajectories of vehicles, obtaining multiple overlapping images (represented as frustums), are shown as in FIG. 6. This figure shows an example of multiple collects, otherwise known as data streams or data collects or sequential image data, in an area that is obtained by the same and/or different vehicles.

Figure 7:
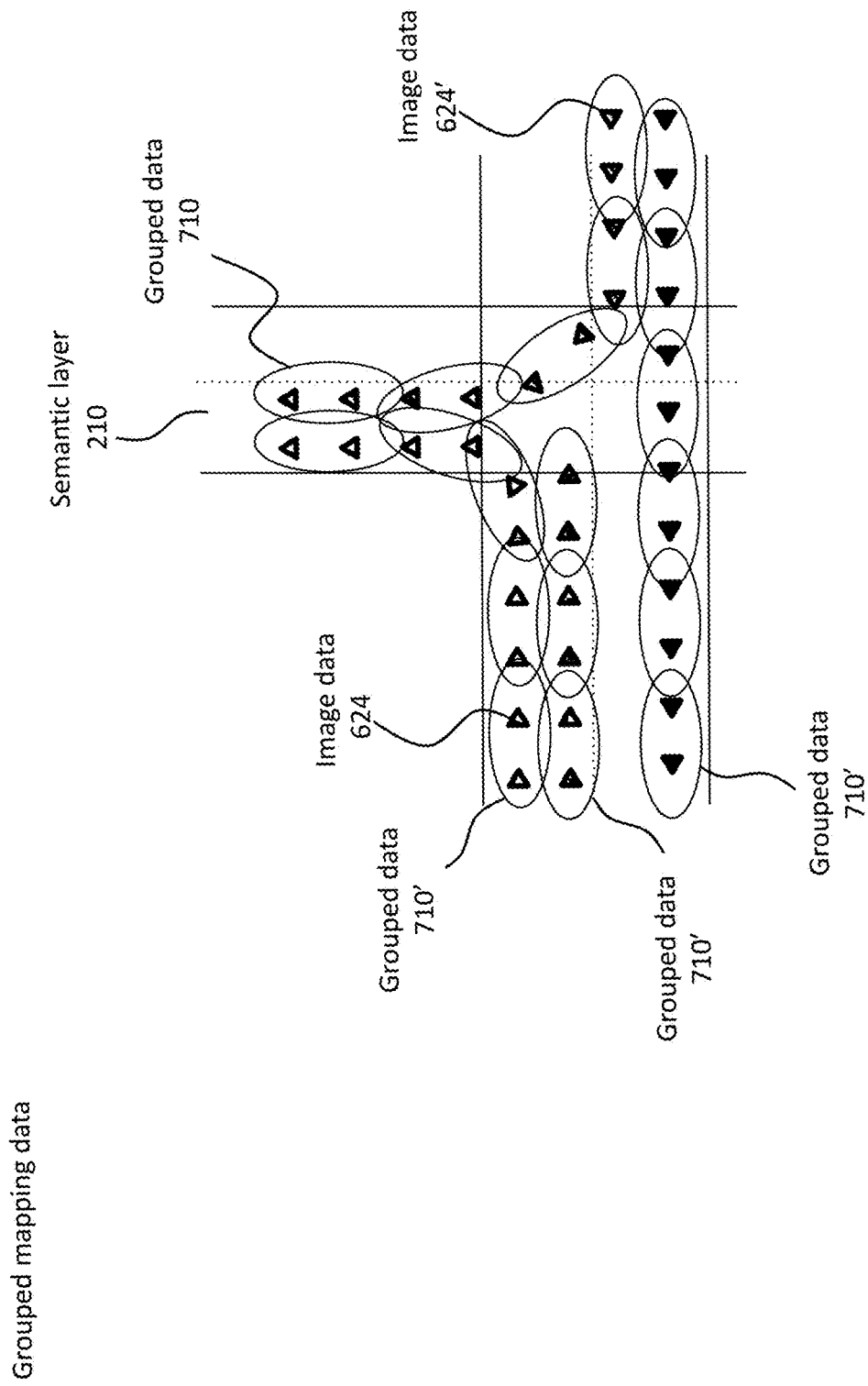
FIG. 7 illustrates a top down view of a semantic layer overlaid with multiple trajectories of obtained image data which are grouped into portions, by geographic area, for processing.
Figure 8:
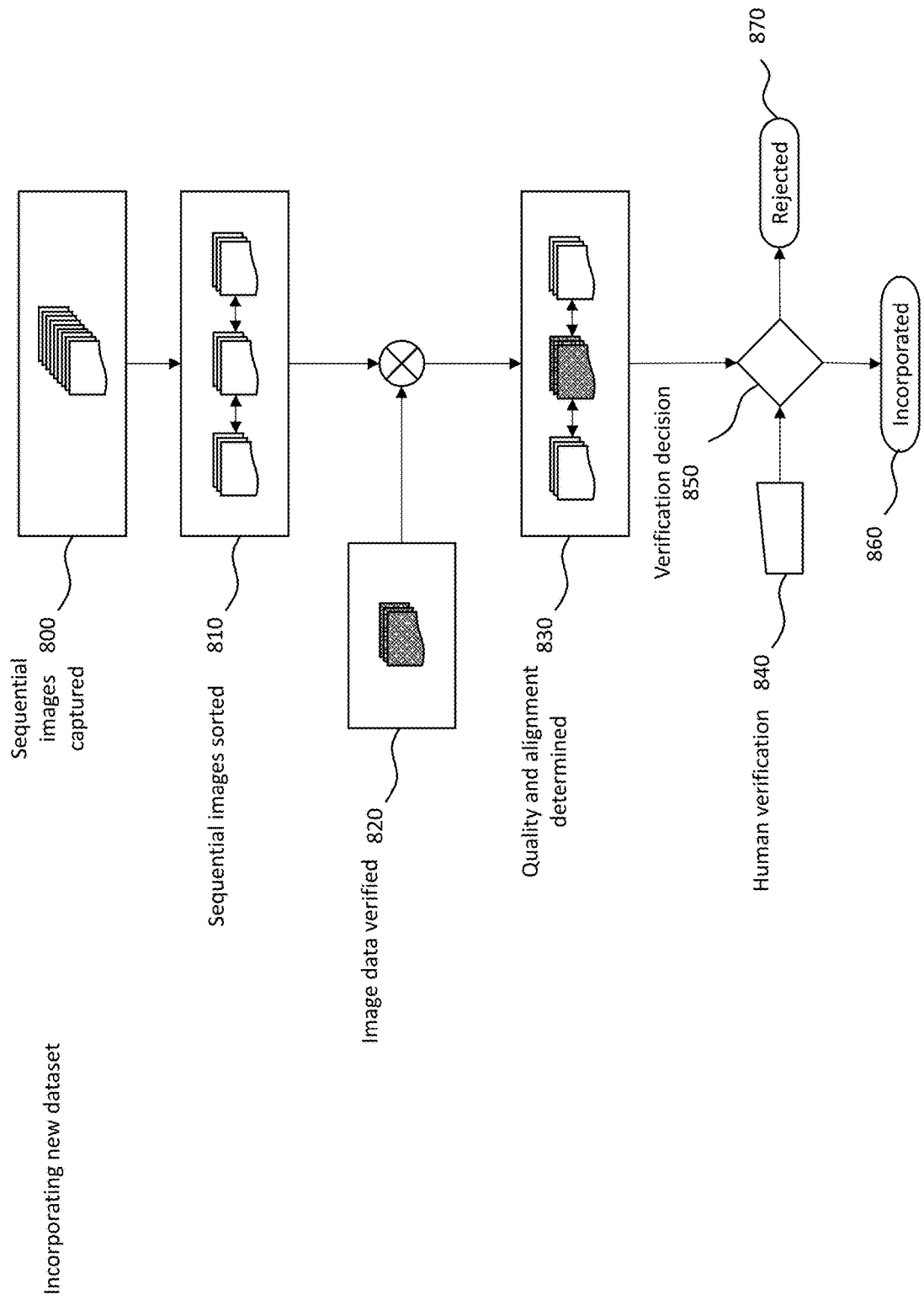
FIG. 8 shows a flowchart depicting the various stages of incorporating new data into a pre-existing map.

As shown as in FIG. 7, in order to build the three-dimensional map, the image data obtained is sorted and grouped together using a method called "batching". This technique creates multiple "visual batches", otherwise known as visual map portions or grouped map portions 710 710', of image data 624 624' (which can be represented by frustums) and/or derived map data, which can then be compiled and aligned to create a three-dimensional visual map. Map data can be derived from the image data using techniques such as visual odometry or Structure-from-Motion (SfM) algorithms on order to reproduce the features of the observed environment from the image data to create or add to a map of the environment.

For example, the pre-processed or pre-generated map can be generated by map generation processes such as using sequential image data to determine portions of the map that can locate or view the same scene, or parts of a scene within an image such as buildings, landmark, and road signs, in order to connect and align neighbouring and/or overlapping areas of map portions. In example embodiments the map portions can be aligned using constraints-based optimisation with variables. Variables include, but is not limited to, poses of all of the images obtained by each mapping vehicle, and constraint include, but is not limited to, poses of images within each of the map segments and the relative pose of images within each of the map portions. In some embodiments, accuracy increasing techniques may be implemented such as bundle-adjusting of the global map. Additionally, SfM can be applied in order to determine the structures of a substantially large dataset of map portions of the global map.

Traditional manual review processes typically lack either scalability or robustness, or both. Typically, large portions of a map, or sometimes an entire pre-processed map, are reviewed for manual verification by a human reviewer. However, because these map portions (or the entire map) are generated using existing map reconstruction techniques, there may be reconstruction failures due to visual association errors, reconstruction errors, scaling errors and/or optimisation errors. Additionally, current methods for allocating workload for manual validation/verification and existing techniques of manually or semi-automatically refining map data are time consuming, usually taking hours to clean and verify a given area of a map as data curators, typically engineers, are presented with a global map with minimal preparation carried out suitable for efficient or effective curation, and thus lacking scalability for larger map data. Data curation, validation and verification, is carried out for a section of the global map, without automated assistance or tools, resulting in output which is of variable quality.

Example embodiments cover how data that needs to be checked automatically/manually/semi-automatically is prepared to enable allocated or prepared tasks to be performed by a data curator. In the example embodiment, units of map data prepared for verification include more than one interdependent map portion and can vary in a number of map portions per unit in accordance to the time it takes to verify the map data or based on the contextual analysis of the interdependent map portions. For example, each task prepared for validation/verification or judgment are typically chosen to be approximately ten to fifteen-minute tasks, however are not limited to these timings and may be shorter or longer tasks (for example depending on the level of quality assurance a particular map portion has previously been assessed for). Units of map data are thus chosen according to desired task durations.

In example embodiments a pre-processed or pre-generated map is generated or received and interdependent map portions are extracted from the pre-processed map where validation is required. The pre-processed map can be segmented into sections or areas of the global map to be verified either automatically, semi-automatically, or manually by a data curator/reviewer. Pre-processed maps, can be flawed due to breaks or errors within the data, lack of data or outliers in data collects.

In embodiments where semi-automated or manual verification is performed, segmented map sections are created from new data and interdependent map portions as a unit of map data and the units of map data are presented to a system or user platform as a set of tasks to be completed based on variables such as approximate time to complete the task of validating that unit for example. The grouped interdependent map portions are determined and prepared for data curation with the associated new map data needing validation and are shown as tasks or units to a data curator through the manual validation system or platform for refinement of the global map by inputting reasoned or quality based judgements, annotations, and/or visual manipulations of the new map data and interdependent map portions.

In example embodiments, interdependent map portions can be determined based on computational cost or efficiency, or determined/predicted numbers of errors or tasks to be performed by a data curator, in order to provide a substantially optimal system for segmenting and collecting and aligning interdependent map portions in generating a global map. Each unit of map data is typically formed of approximately one-thousand image frames although it is not limited to this size.

In example embodiments, various stages can be incorporated into the process of the manual curation system and manual curation. For example, as new image data 820 is obtained from new vehicle trajectories, new image data 820 can be connected and aligned to form new or updated map portions for manual verification/review. In this way, new image data can be linked with neighbouring and/or interdependent map portions as shown as step 830 in FIG. 8 in order to determine the quality and standard of alignment of the connected and aligned map data. The quality and alignment assessment of the new image data for example can be determined by input 840 provided by a manual curator and thus rejecting or incorporating the new image data 820 into pre-existing map portions/maps.

In example embodiments, connected and aligned interdependent map portions within the pre-processed global map are segmented into unit tasks of an area or zone of the map corresponding to a geographical area for manual verification. Typically, each unit prepared and presented for a data curator to verify includes, but is not limited to, three to five connected and aligned map portions in order to create a section of the map to be assessed semi-automatically with a human-in-the-loop. In some embodiments, any traditional processing technique can be implemented in order to prepare units for a user, for example breadth for search may be carried out in preparing units. Breadth for search involves the processing of all map portions to prepare a set combination of each map portion with its neighbouring or overlapping or substantially overlapping map portions for the user. This is carried out to prepare any number of interdependent map portions together, for example groups of three map portions. Such algorithmic techniques consider all map portions and is fast and easy to compute.

Figure 9:
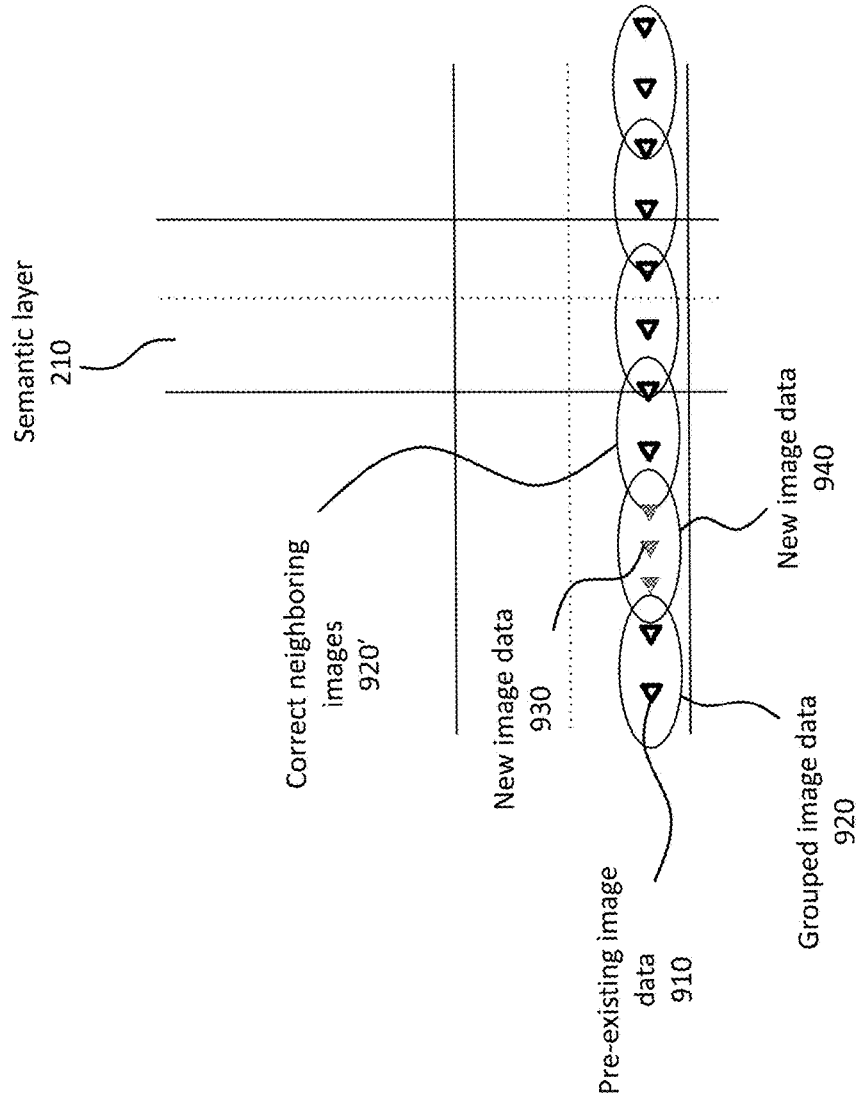
FIG. 9 illustrates a top down view of a semantic layer showing a batch of new image data for a geographic area to be incorporated into the map, with interdependent map portions also shown.
Figure 10:
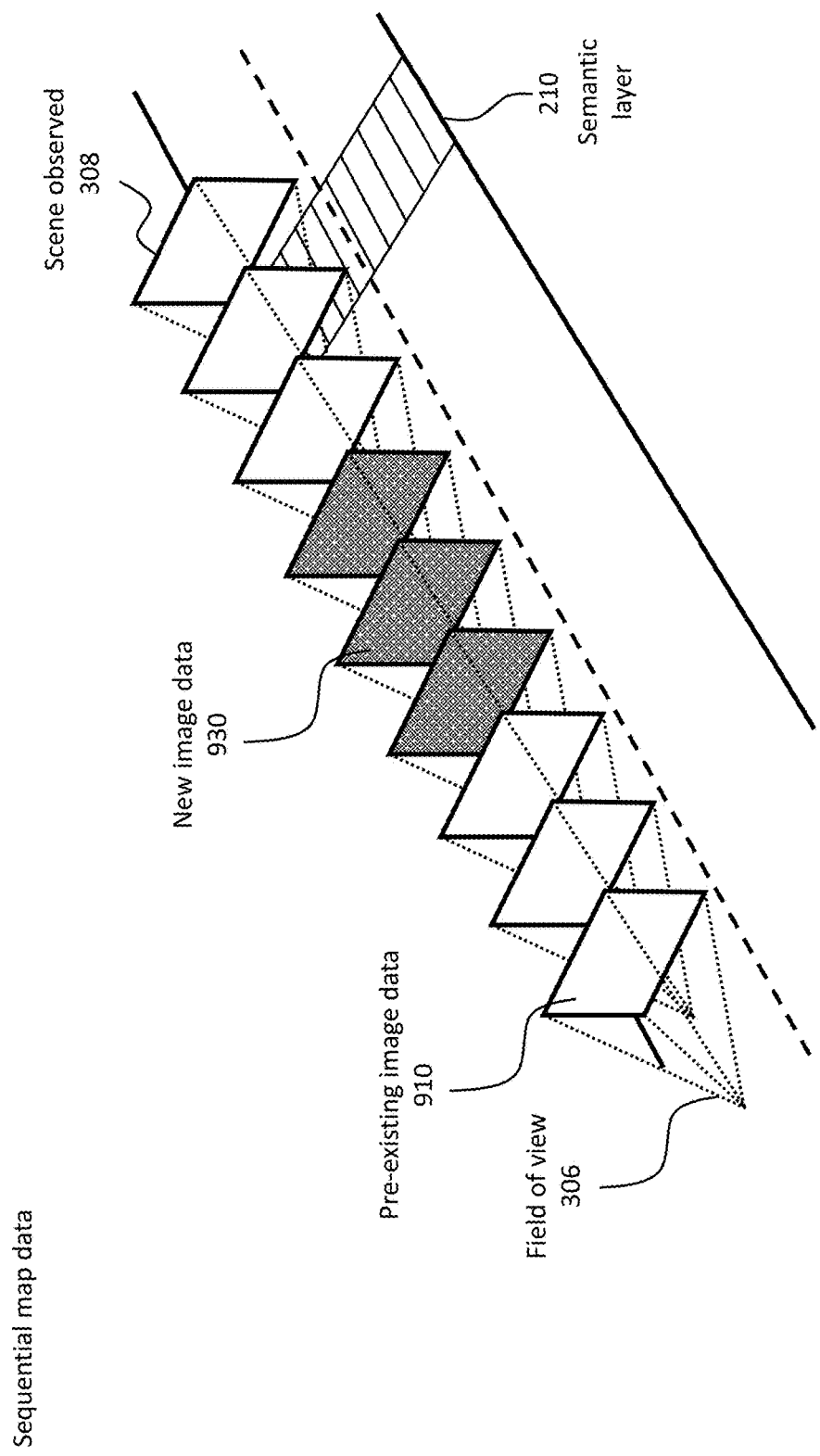
FIG. 10 shows a perspective view of FIG. 8 showing a semantic layer, the new image data obtained to be verified for incorporation into the pre-existing map and neighbouring interdependent map portions.

For example, as shown as in FIGS. 9 and 10, interdependent map portions of one or more trajectories can be collected together. In this way, new image data 930 obtained (corresponding to a geographical area) requiring verification or validation can be grouped into a map portion 940, and can be integrated and combined with pre-existing image data 910. FIG. 9 shows this example embodiment in a top down view of a semantic layer 210 of a focused area of the wider geographic area and FIG. 10 depicts this in a perspective view. More particularly, the new map portion 940 of the new image data 930 is integrated, based on its interdependency, with the pre-existing neighbouring and/or overlapping groups of image data 920 920' that may have been previously determined to be correct of which have already been verified.

In some embodiments, however, interdependent map portions may be combined, collected or grouped together in various permutations for the purposes of this invention. For example, each unit can be generated or determined based on geographical area or poses of image data within each of the map portions being collected together or can vary according to time it takes to verify map data or based on the contextual assessment of the map portions. For computation at cost efficiency, systems can group and prepare map portions together based on a variety of factors.

Typically, map portions are grouped together based on location, substantially similar pose data, timeframe in which the image data is obtained, and/or quality of neighbouring or overlapping map portions can assist data curation as such filtering of map portions can guide data curators in substantially refining map data. For example, interdependent map portions may be grouped together based on their level of quality such as grouping together good quality map portions with bad quality map portions in order to provide the manual verifier guidance in making well-reasoned judgements.

Figure 11:
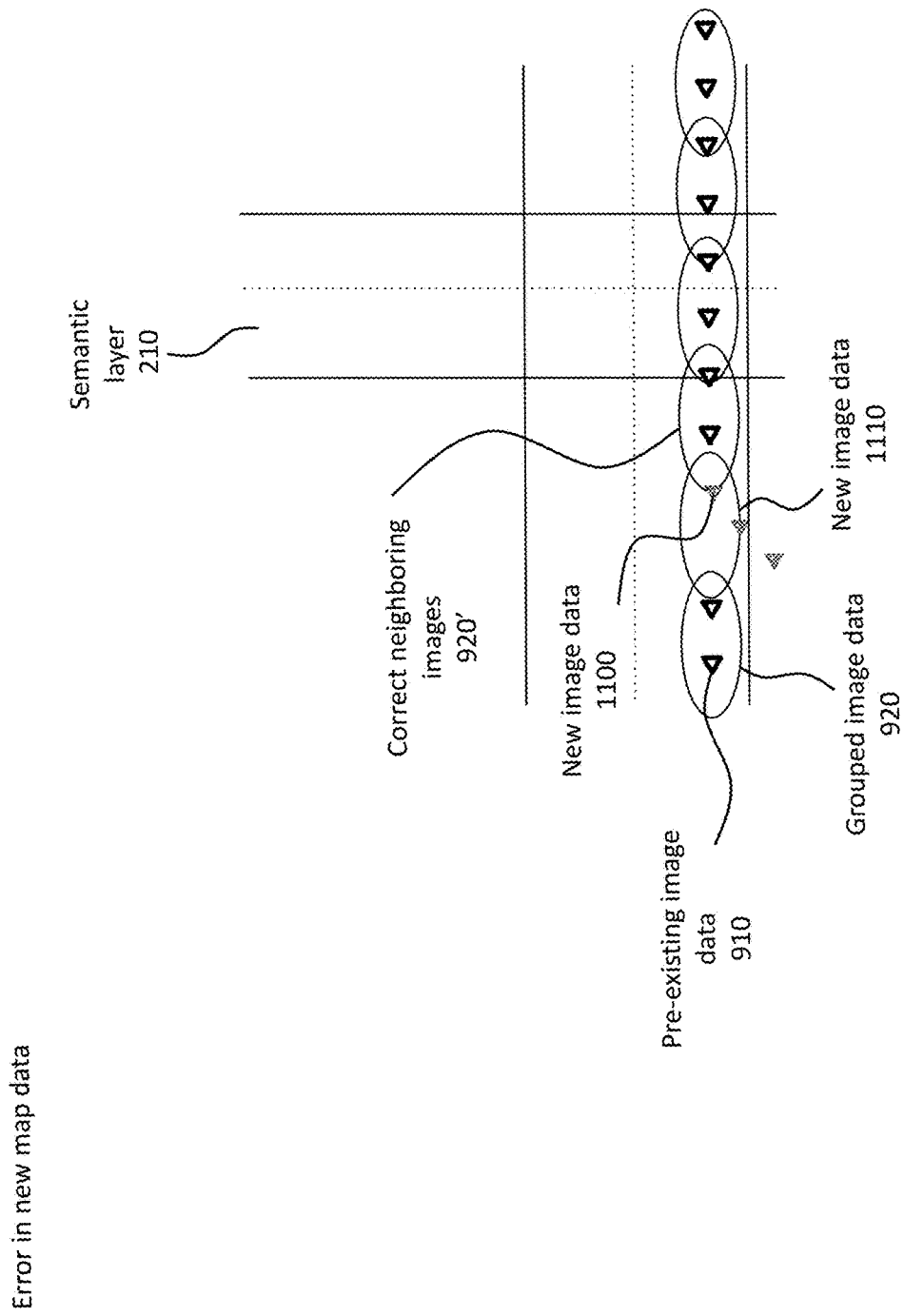
FIG. 11 illustrates a top down view of a semantic layer overlaid with mapping data, showing an error in the new image data.
Figure 12:
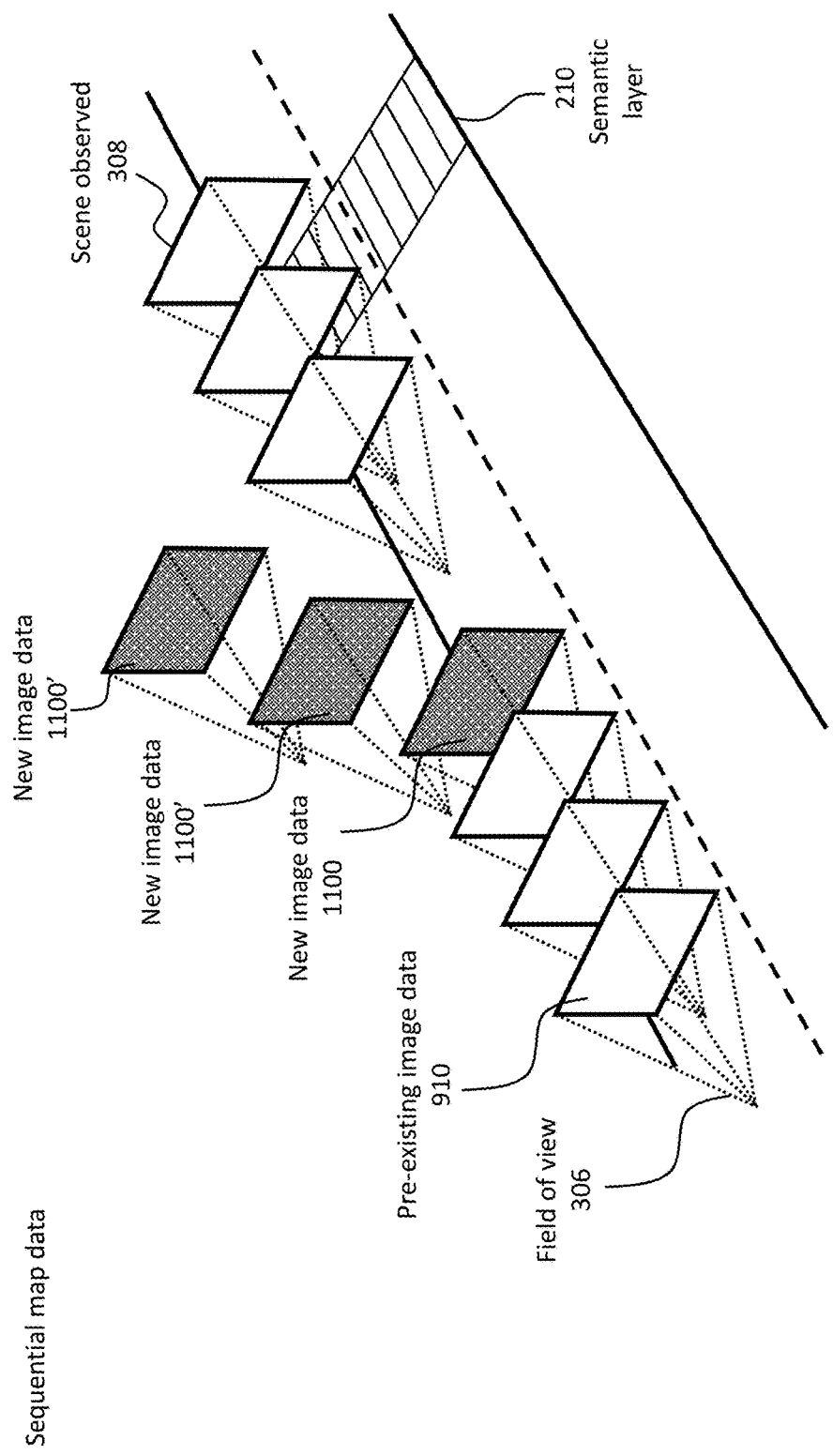
FIG. 12 shows a perspective view of FIG. 11 showing a semantic layer, the new mapping data and neighbouring interdependent map data.

For example, as shown as in FIGS. 11 and 12, interdependent map portions of one or more trajectories can be collected together. In this way, new image data 930 obtained corresponding to a geographical area, that may require verification or validation, can be grouped into a map portion 1110, and can be integrated and combined with pre-existing image data 910. FIG. 11 shows an example embodiment as a top down view of a semantic layer 210 of a focused area of the wider geographic area and FIG. 12 depicts this in a perspective view. More particularly, the new map portion 1110 of the new image data 1100, evidently containing an error, is shown with the pre-existing neighbouring interdependent and/or overlapping groups of image data 920 920' that may have been previously determined to be correct or which have already been verified. In this way, it can be of assistance to data curators to be provided with a combination of "good" and "bad" map portions which have been previously automatically detected and/or manually verified. For example, map portions may be highlighted as such to demonstrate good and bad map portions and also to efficiently pin-point which of the map portions or image data required concentrated assessment or verification.

In example embodiments, interdependent map portions may be grouped together by context. For example, by including previously verified map portions into a unit of map portions the manual verifier may be able to make more accurate or better reasoned judgements based around context of the area. In example embodiments, the data curator can be required to review and verify image data within map portions in order to recreate or update the global map or sections of the global map.

In some embodiments, in order to assist the process of manual data curation, it can be useful to understand the mapped environment such as the vehicle path used to create map portions in order to assess map portions more effectively. In example embodiments, units of interdependent map portions are presented to the data curator based on co-geographical location. Example embodiments, however, may also present tasks in substantially computationally cost efficient or cost effective method depending on a variety of factors, such as for example the geographical location of the manual verifier, the time set for tasks on each of the manual verifier's platform or system, or alternatively the data curator/reviewer may be capable of selecting tasks to be performed. In example embodiments, a system is provided for determining which of the interdependent map portions require verification of units sent to a data curator for verification. The verification of units requires the data curator to make judgements on different areas of the map or unit portion of the map.

In example embodiments a user interface system or platform is provided that this suitable for the user to use it to make judgments and verify units of given map portions. A data curator checks each map portion within the unit, the determined section, and inputs one or more judgments such as "good map portion" or "bad map portion". Such system or platform can help filter the pre-processed global map in order to refine or update the map and generate a more accurate or map of better quality. In example embodiments, the user interface for user input can provide a map layer presentation which can display to the data curator a centred view of the map, including batches, frustums and their corresponding point cloud.

The verification of tasks is performed via a user interface platform to essentially visualize and "clean" maps. Users may also be able to create annotated comments regarding any aspect of the task being assessed. By way of semi-automatically validating or verifying map portions to be used to regenerate a global map essentially solves the problems that arise from assumptions of automatic assessment and analysis, which are known to a person skilled in the art. Map cleaning is the manual process of visually inspecting maps and labelling the broken areas. The aim of cleaning is to identify broken visual map portions. For example, as each batch represents a segment of the road, broken map portions can be any which fail to recreate the area they are representing. Map portions can break for numerous reasons and a guide will help outline the most common errors which cause map portions to break. The goal of cleaning is to identify all the broken map portions, which can then be removed to help increase the quality of the final map. Prior to presenting grouped map portions for manual verification, there can be provided a step of automated processing of the grouped map portions in order to highlight high confidence defects to data curators.

In some embodiments, the user interface system or platform may be provided such that the data curator is provided with tools to, for example, rotate map portions, highlight map portions, label map portions, or visualize the impact of decisions or inputs. Inputs may include for example, labelling buildings, road names, tourist attractions or landmarks, identification of cars, or other transportation vehicles etc. As tasks are generated, a pool of tasks may be allocated to each of the data curators or a plurality of data curators in some embodiments. In some embodiments, for quality assurance purposes, once a task has been completed or a unit has been verified or annotated, the task may be passed onto a second data curator for further assessment and analysis. However, in some semi-automated processes, the computer system or algorithm may take over in further assessing the map portions.

In example embodiments, errors and artefacts can be evident in pre-processed map data due to factors such as image sensor noise, unmodelled motion, and images suffering from drift. Thus, the data curator can verify various pieces of data such as verifying "broken" map portions for example. In example embodiments, there can be guidance to help reviewers to understand broken/good map portions. Data curators can also select to remove a map portion to view that the section looks like without it. The data curator may be provided with guidelines or a set of instructions as reference for determining when a map portion is broken, what causes map portions to break, how to identify outliers and errors etc. Guidelines/instructions for data curation can demonstrate to data curators, how map portions should be assessed, why map portions contain errors or defects and explanation of those errors, how to identify such errors, and how to input and submit results. Such guidelines/instructions can provide consistency to the data curation process and can also be used to effectively train new data curators. Through the user interface system or platform, the data curator may also be capable of identifying incorrect image poses of image data. In embodiments, map portions can be determined as broken is there is a high certainty of inaccurate data and vice versa.

In examples of automatic or semi-automatic or manual data curation, the data curator or data curating system may take the steps of, however not limited to: examining each of the map portions within each unit task; examine poses of imaging devices; examine poses of frustums or any representation of image devices; examine structures such as buildings; make decisions based on various examinations or assessments. Data curators can review and verify existing map portions, newly generated map portions, and existing map portions which have already been through the verification process.

In example embodiments, a guide may be provided to data curators to help data curators understand scenarios which cause map portions to break. Many errors can potentially arise, and the severity of the error may be a subjective one. As a result, it is extremely difficult to implement a fully automated system and thus, a semi-automated system with guidance provided to data curators through a user platform. As a results, the quality checking of map portions is heavily reliant on data curators' discretion thus it is vital to ensure they are accurate as possible.

Figure 13:
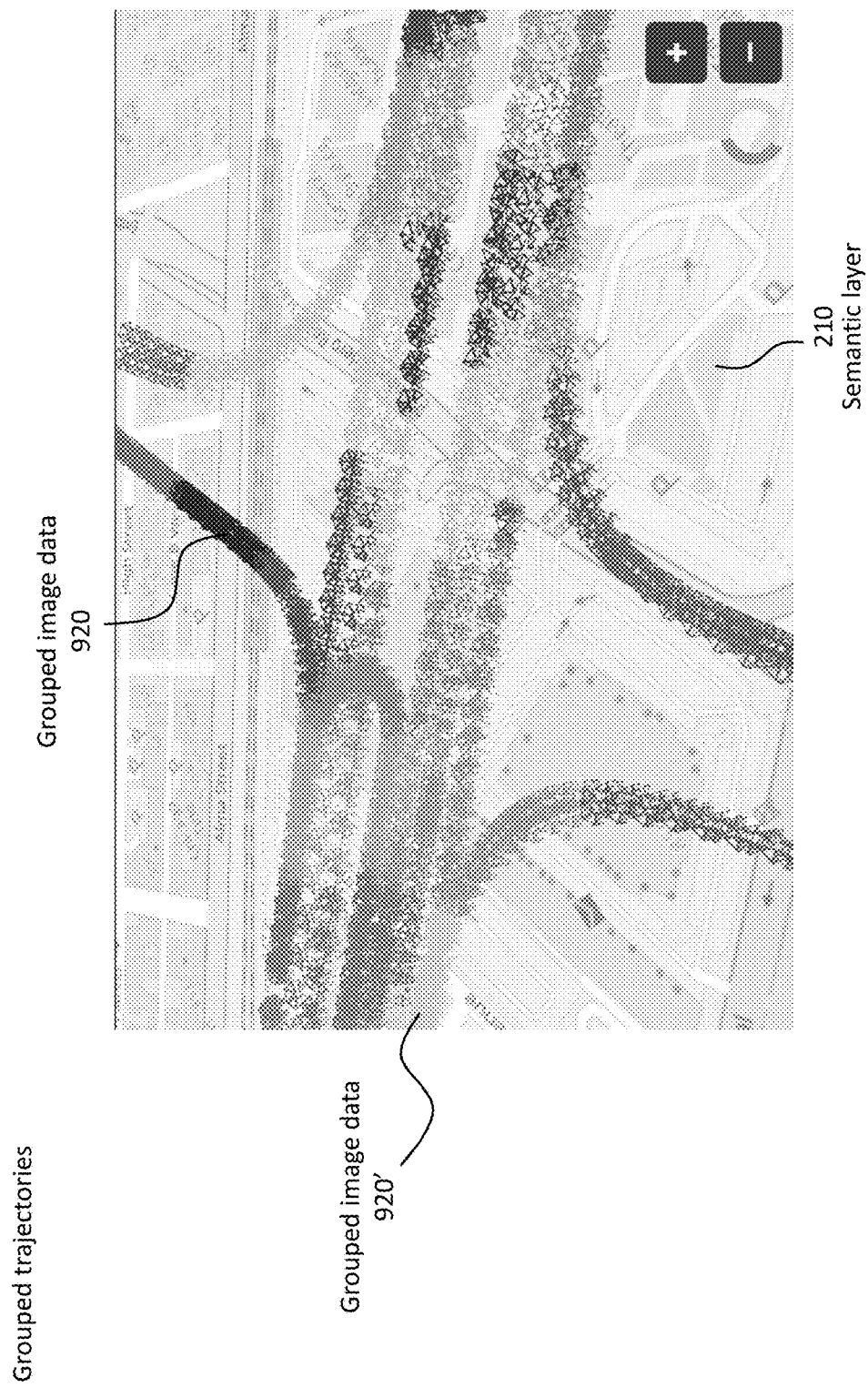
FIG. 13 shows an example user interface image showing groups of trajectories in the form of frustums, which can be used to generate map portions of the geographical area.

As shown in FIG. 13, a user interface image showing groups of trajectories in the form of frustums for example can be shown to manual curators. More specifically, FIG. 13 shows a semantic layer of a geographical area 210 with an overlay of groups of image data 910 and 910' used to generate map portions for manual curation. Typically, preprocessed map data can contain defects or errors such as frustum mis-alignment, GPS mis-alignment, gravity mis-alignment, or scale drift for example. Thus, it is tasked to data curators to make reasoned judgements based on guidelines and data curation tools to identify such errors to correct or manipulate map portions. For example, a data curator may distinguish whether a map portion is broken due to misalignment using its surroundings and surrounding map portions for context of the vehicle's trajectory and whether the map portion is aligned to the road or vehicle path it is representing.

In example embodiments, the map may not be provided as a traditional representation of the road network. Instead, it can be shown for example as a geometric map which uses images and point clouds to create a three-dimensional environment. In example embodiments, map portions may be surrounded, in the visualisation of the map portion, by a collection of data points that define the shape of the structures around each map portion. Point clouds are an accurate representation of the vehicle's surroundings obtained from vehicle sensors and can be used to determine structures, landmarks and road specifications.

For pre-processed maps, the most common error for map portion breaking is frustum misalignment. As the majority of the information holding a frustum in its true space comes from metadata, any missing data can cause map portions to break. In order to determine various visually identifiable errors, data curators and/or an automated system can look to see if there are any "floating" frustums which are not connected or aligned to other portions of the map. By providing map data to a human curator to investigate each of the segmented map portions, it can be evident to the human curator that each map portion either fully overlaps with other map portions, fluidly connects with other map portions at either of its ends, or does not. As such, even without access to a reference map such as open street maps (OSM), it can be deduced that the map portions are/are not broken. If a map portion were to be broken, it would appear disconnected from surrounding map portions.

In some embodiments, automated data curation may implement thresholding or a weighting value or score in determining frustum misalignment, for example by checking if map portions have 10% or more of frustums within that portion that are misaligned and these are hidden or removed from the map data. Additionally, in some embodiments, the data curation system may also detect frustum clustering, i.e. clusters of frustums which indicate with strong confidence that there is a broken map portion. Data curation systems or a manual data curator, through the use of a platform, can identify frustums that are overlapping with one another in a cluster formation by inspecting the data.

In example embodiments, it may also be possible to identify broken map portions using the frustum's global positioning satellite (GPS) data. However, it should be noted that GPS data may not be accurate and is not usually used as the ground truth. In some embodiments, gravity alignment may also be evident and can be identified where map portions do not conform with the z-axis of the visualisation. However, if batches are consistent with one another and make a rapid dip or rise, this may indicate an overpass and not a gravity alignment issue so would typically be something a manual review would curate. Gravity alignment issues usually appear as individual standalone lines of frustums separate from the rest of the map portions. Manual data curators can identify such as error by shifting or rotating the visualisation using the curation tool to check the z-axis tilt of the map portions or task.

In some embodiments, scale drift may be evident as distances between frustums can change in correlation with the velocity of the vehicle. However, there are cases where distances between frustums will increase at rates that are not possible. This is a problem caused by inaccuracies in measurement that make it visually seem like frustums are moving farther than they actually did. In order to check for such an error, automated systems or a manual data curator can check whether distances between frustums increase or decrease more significantly than normal. This can be referenced to the timestamps between frustums to check that car velocity has not increased or decreased.

In some embodiments, the user can also use the curation tool functions through the user interface such as: hiding map portions; re-centring a map; re-orientating map portions; reducing point cloud size; increasing point cloud size; moving between map portions; rotation tilting; zooming in and out. In some embodiments of the user interface, the user can also highlight batches by for example selecting pre-set tabs from the user interface menu. Frustum size and thickness can also be adjusted by the user through the user interface. The user interface may further enable the user to increase and decrease the resolution of map layers displayed to the user. Additionally, in some embodiments each map portion may be displayed to the user in a different colour or pattern in order to highlight each of the different batches to provide a more user-friendly interface. Real-time visualisation of manual manipulation can assist data curators with quality checking of their inputs and refinements to curate a substantially optimal portion of the global map. In some embodiments, additional plug-ins may provide further tools to assist data curators to manually verify each task assigned or presented via the data curation platform and can for example be used to use shortcuts within the data curation platform user interface for more efficient data curation.

Figure 14:
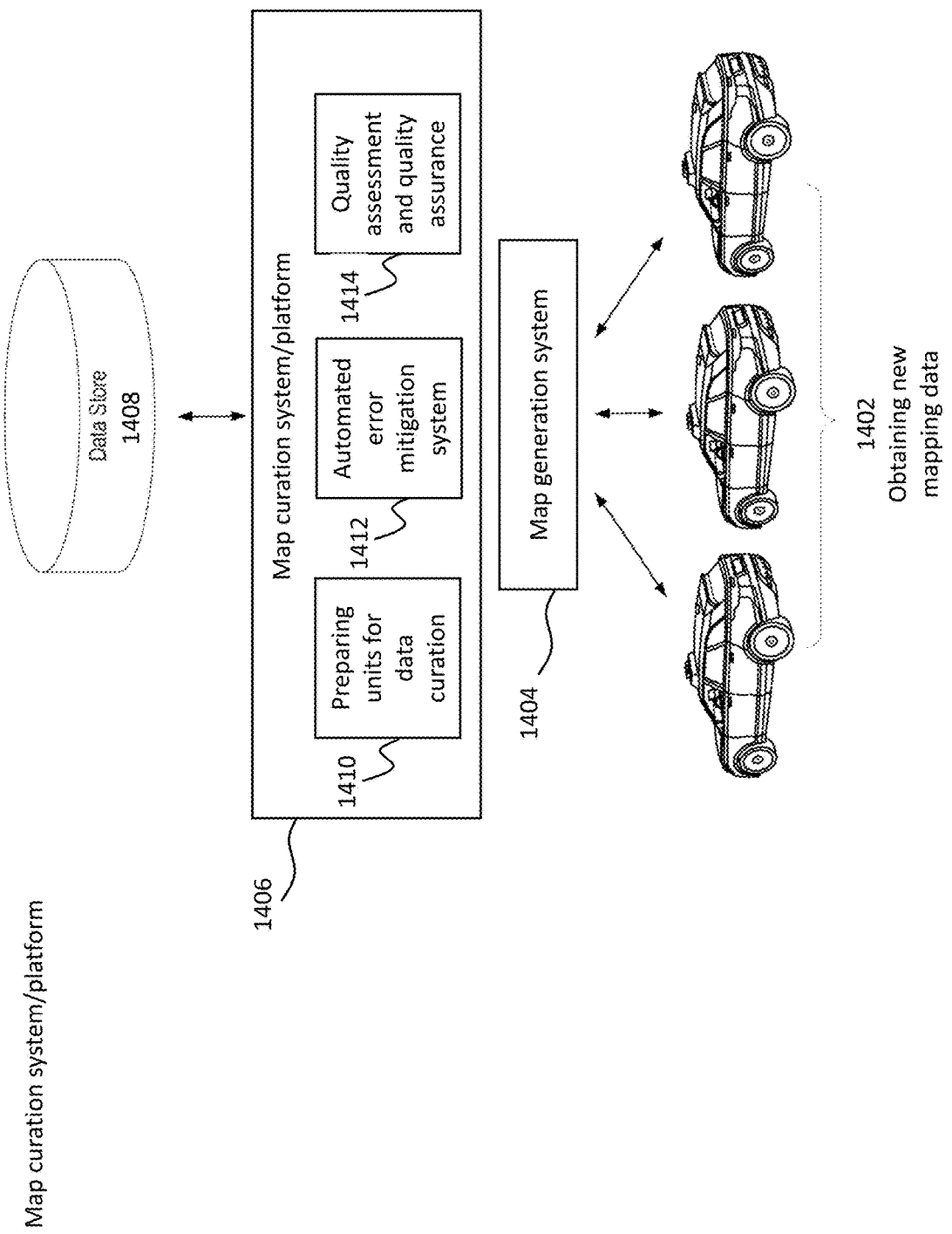
FIG. 14 shows an example system according to an embodiment of the present invention, showing the modules of a semi-automated map data curation system/platform.

FIG. 14 illustrates a simplified version of an example environment according to an example embodiment of the present technology. The environment 1400 shown in the embodiment of FIG. 14 includes an example map generation system 1404, a data store 1408, and multiple transportation vehicles 402. The map generation system 1404 provides the pre-processed data to be input into the data curation system or platform 1406. The semi-automated map data curation system/platform 1406 embodies further map data processing techniques and tools specific to data curation. In FIG. 14, the semi-automated map data curation system/platform 1406 comprises a preparation unit for data curation 1410, an automated error mitigation module 1412, and a quality assessment/quality assurance user interface for manual data curation 1414.

In some embodiments, a navigation system may be implemented in order to assist the map generation system. In further embodiments, there may be a road network navigation system or otherwise which may have data on the relevant transportation vehicle travel routes. Various approaches may be used and applied to the navigation of the transportation vehicle in order to connect real world data to the map generation system.

In example embodiments, once a task is verified, complete, and/or submitted, the results can be saved or stored, and the same task can be accessed with the same URL for example. After a task is submitted, all hidden map portions or those that have been marked or highlighted as errors or broken may be visualised or shown as red for example. This makes the quality assurance and subsequent reviewer's task simple for the next reviewer. Additionally, once map portions have been verified and submitted following verification, map portions can be stored for further distribution for quality assurance or be used as training data for an automated data curation system.

Image data obtained for processing by at least one image sensor attached to each of the transportation vehicles, in example embodiments, may be in the form of a raw image file in order to save, with minimum loss of information, data obtained from the sensor, and the conditions surrounding the capturing of the image, i.e. metadata. In example embodiments, in order to convert image metadata into a photographic rendering of a scene, and then store them as a standard graphical format, processing may be carried out locally within the image sensor, or in a raw-file converter, or by using a remote system. Typically, processing image data may include, but not limited to, decoding, defective pixel removal, noise reduction, compression, optical correction, or dynamic range compression.

A map is a depiction of a whole area or a part of an area which emphasises the relationships between elements in space such as objects, landmarks, road signs, road names, or location. In some embodiments, a road map may display transport links and include points of interest, such as prominent buildings, tourism sites, recreational facilities, and airports. In example embodiments, maps or sections of a map may be dynamic and/or interactive with integration of an automatic or a semi-automatic system. In a semi-automated system, manual input may be used to adjust, correct, or update sections or whole of the map. In some embodiments, the map may be viewed using a user interface and may be shown as a variety of forms such as a topological map in the form of a schematic diagram, a multi-layer map, or a single corrected and substantially optimised global map or section of the map.

In embodiments, raw and/or processed image data may be stored within a cloud storage which may be accessed through a web service application programming interface (API) or by applications that utilize the API, such as a cloud desktop storage, a cloud storage gateway, or web-based content management systems. Typically, data may be stored locally or remotely in order to efficiently access data. For image data obtained of the real world, decryption keys may be used in order to limit the access of data and securely store the data obtained by the use of image sensors.

Many variations to the example method are possible. It should be appreciated that there can be additional, fewer, or alternative steps performed in similar or alternative orders, or in parallel, within the scope of the various embodiments discussed herein unless otherwise stated.

Figure 15:
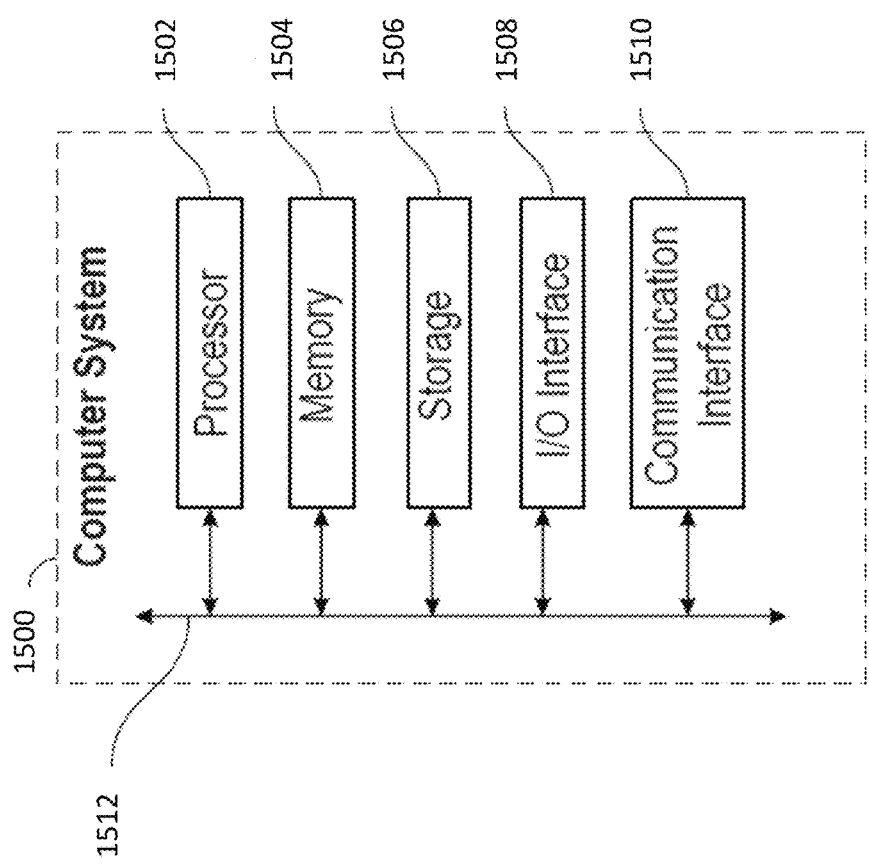
FIG. 15 illustrates an example of a computer system or computing device that can be utilized in various scenarios, according to an embodiment of the present technology.

FIG. 15 illustrates an example computer system 1500. In particular embodiments, one or more computer systems 1500 perform one or more steps of one or more methods described or illustrated herein. In particular embodiments, one or more computer systems 1500 provide the functionalities described or illustrated herein. In particular embodiments, software running on one or more computer systems 1500 performs one or more steps of one or more methods described or illustrated herein or provides the functionalities described or illustrated herein. Particular embodiments include one or more portions of one or more computer systems 1500. Herein, a reference to a computer system may encompass a computing device, and vice versa, where appropriate. Moreover, a reference to a computer system may encompass one or more computer systems, where appropriate.

This disclosure contemplates any suitable number of computer systems 1500. This disclosure contemplates computer system 1500 taking any suitable physical form. As example and not by way of limitation, computer system 1500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1500 may include one or more computer systems 1500; be unitary or distributed; span multiple locations; span multiple machines; span multiple data centers; or reside in a cloud, which may include one or more cloud components in one or more networks. Where appropriate, one or more computer systems 1500 may perform without substantial spatial or temporal limitation one or more steps of one or more methods described or illustrated herein. As an example, and not by way of limitation, one or more computer systems 1500 may perform in real time or in batch mode one or more steps of one or more methods described or illustrated herein. One or more computer systems 1500 may perform at different times or at different locations one or more steps of one or more methods described or illustrated herein, where appropriate.

In particular embodiments, computer system 1500 includes a processor 1502, memory 1504, storage 1506, an input/output (I/O) interface 1508, a communication interface 1510, and a bus 1512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1502 includes hardware for executing instructions, such as those making up a computer program. As an example and not by way of limitation, to execute instructions, processor 1502 may retrieve (or fetch) the instructions from an internal register, an internal cache, memory 1504, or storage 1506; decode and execute them; and then write one or more results to an internal register, an internal cache, memory 1504, or storage 1506. In particular embodiments, processor 1502 may include one or more internal caches for data, instructions, or addresses. This disclosure contemplates processor 1502 including any suitable number of any suitable internal caches, where appropriate. As an example and not by way of limitation, processor 1502 may include one or more instruction caches, one or more data caches, and one or more translation lookaside buffers (TLBs). Instructions in the instruction caches may be copies of instructions in memory 1504 or storage 1506, and the instruction caches may speed up retrieval of those instructions by processor 1502. Data in the data caches may be copies of data in memory 1504 or storage 1506 that are to be operated on by computer instructions; the results of previous instructions executed by processor 1502 that are accessible to subsequent instructions or for writing to memory 1504 or storage 1506; or any other suitable data. The data caches may speed up read or write operations by processor 1502. The TLBs may speed up virtual-address translation for processor 1502. In particular embodiments, processor 1502 may include one or more internal registers for data, instructions, or addresses. This disclosure contemplates processor 1502 including any suitable number of any suitable internal registers, where appropriate. Where appropriate, processor 1502 may include one or more arithmetic logic units (ALUs), be a multi-core processor, or include one or more processors 1502. Although this disclosure describes and illustrates a particular processor, this disclosure contemplates any suitable processor.

In particular embodiments, memory 1504 includes main memory for storing instructions for processor 1502 to execute or data for processor 1502 to operate on. As an example, and not by way of limitation, computer system 1500 may load instructions from storage 1506 or another source (such as another computer system 1500) to memory 1504. Processor 1502 may then load the instructions from memory 1504 to an internal register or internal cache. To execute the instructions, processor 1502 may retrieve the instructions from the internal register or internal cache and decode them. During or after execution of the instructions, processor 1502 may write one or more results (which may be intermediate or final results) to the internal register or internal cache. Processor 1502 may then write one or more of those results to memory 1504. In particular embodiments, processor 1502 executes only instructions in one or more internal registers or internal caches or in memory 1504 (as opposed to storage 1506 or elsewhere) and operates only on data in one or more internal registers or internal caches or in memory 1504 (as opposed to storage 1506 or elsewhere). One or more memory buses (which may each include an address bus and a data bus) may couple processor 1502 to memory 1504. Bus 1512 may include one or more memory buses, as described in further detail below. In particular embodiments, one or more memory management units (MMUs) reside between processor 1502 and memory 1504 and facilitate accesses to memory 1504 requested by processor 1502. In particular embodiments, memory 1504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1504 may include one or more memories 1504, where appropriate. Although this disclosure describes and illustrates particular memory, this disclosure contemplates any suitable memory.

In particular embodiments, storage 1506 includes mass storage for data or instructions. As an example and not by way of limitation, storage 1506 may include a hard disk drive (HDD), a floppy disk drive, flash memory, an optical disc, a magneto-optical disc, magnetic tape, or a Universal Serial Bus (USB) drive or a combination of two or more of these. Storage 1506 may include removable or non-removable (or fixed) media, where appropriate. Storage 1506 may be internal or external to computer system 1500, where appropriate. In particular embodiments, storage 1506 is non-volatile, solid-state memory. In particular embodiments, storage 1506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1506 taking any suitable physical form. Storage 1506 may include one or more storage control units facilitating communication between processor 1502 and storage 1506, where appropriate. Where appropriate, storage 1506 may include one or more storages 1506. Although this disclosure describes and illustrates particular storage, this disclosure contemplates any suitable storage.

In particular embodiments, I/O interface 1508 includes hardware or software, or both, providing one or more interfaces for communication between computer system 1500 and one or more I/O devices. Computer system 1500 may include one or more of these I/O devices, where appropriate. One or more of these I/O devices may enable communication between a person and computer system 1500. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1508 for them. Where appropriate, I/O interface 1508 may include one or more device or software drivers enabling processor 1502 to drive one or more of these I/O devices. I/O interface 1508 may include one or more I/O interfaces 1508, where appropriate. Although this disclosure describes and illustrates a particular I/O interface, this disclosure contemplates any suitable I/O interface.

In particular embodiments, communication interface 1510 includes hardware or software, or both providing one or more interfaces for communication (such as, for example, packet-based communication) between computer system 1500 and one or more other computer systems 1500 or one or more networks. As an example, and not by way of limitation, communication interface 1510 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 1510 for it. As an example and not by way of limitation, computer system 1500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1500 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 1500 may include any suitable communication interface 1510 for any of these networks, where appropriate. Communication interface 1510 may include one or more communication interfaces 1510, where appropriate. Although this disclosure describes and illustrates a particular communication interface, this disclosure contemplates any suitable communication interface.

In particular embodiments, bus 1512 includes hardware or software, or both coupling components of computer system 1500 to each other. As an example and not by way of limitation, bus 1512 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1512 may include one or more buses 1512, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A or B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Methods described herein may vary in accordance with the present disclosure. Various embodiments of this disclosure may repeat one or more steps of the methods described herein, where appropriate. Although this disclosure describes and illustrates particular steps of certain methods as occurring in a particular order, this disclosure contemplates any suitable steps of the methods occurring in any suitable order or in any combination which may include all, some, or none of the steps of the methods. Furthermore, although this disclosure may describe and illustrate particular components, devices, or systems carrying out particular steps of a method, this disclosure contemplates any suitable combination of any suitable components, devices, or systems carrying out any suitable steps of the method.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, modules, elements, feature, functions, operations, or steps, any of these embodiments may include any combination or permutation of any of the components, modules, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

Any system feature as described herein may also be provided as a method feature, and vice versa. As used herein, means plus function features may be expressed alternatively in terms of their corresponding structure.

Any feature in one aspect may be applied to other aspects, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects can be implemented and/or supplied and/or used independently.

We claim:

1. A method comprising:
   generating a plurality of interdependent map portions from a global map;
   determining, from the plurality of interdependent map portions, at least one interdependent map portion that requires validation;
   creating at least one group of interdependent map portions that corresponds with a trajectory, the group of interdependent map portions comprising:
      the determined at least one interdependent map portion that requires validation; and
      at least one additional interdependent map portion that has been previously verified; and
   outputting the at least one group of interdependent map portions for validation.

2. The method of claim 1, wherein each of the plurality of interdependent map portions comprises a plurality of image data;
   further wherein the plurality of image data comprises at least a pose of each of the plurality of image data.

3. The method of claim 1, wherein each of the plurality of interdependent map portions comprises context data.

4. The method of claim 3, wherein each of the plurality of interdependent map portions overlaps with one or more of the plurality of interdependent map portions based on the context data.

5. The method of claim 3, wherein the context data comprises at least one of: overlap of map data; geographical area; radius surrounding the each of the plurality of interdependent map portions; pose of the each of the plurality of interdependent map portions; timeframe of each of the plurality of interdependent map portions; quality of each of the plurality of interdependent map portions; overlap of scenes viewed by an image sensor; overlap of map data; semantic data; aerial view of the geographic information; system confidence values; or overlap of nearby structures.

6. The method of claim 1, wherein the determined at least one interdependent map portion includes an error, and wherein the at least one group of interdependent map portions is created based on a relationship between the determined at least one interdependent map portion and the at least one additional interdependent map portion.

7. The method of claim 1, wherein the at least one group of interdependent map portions is created based on contextual analysis of each of the at least two of the plurality of map portions that require verification of the overlap between said plurality of map portions.

8. The method of claim 1, wherein the at least one group of interdependent map portions is created based on at least one of: one or more good quality map portions or one or more bad quality map portions.

9. The method of claim 1, further comprising outputting the at least one group of interdependent map portions for at least one of: manual validation, automatic validation, or semi-automatic validation.

10. The method of claim 9, wherein the at least one of: manual validation, automatic validation, or semi-automatic validation is based on image data analysis for error identification or for manual validation assistance.

11. The method of claim 9, wherein the at least one of: manual validation, automatic validation, or semi-automatic validation is based on at least one of: overlap of map data; geographical area; radius surrounding the each of the plurality of interdependent map portions; pose of each of the plurality of interdependent map portions; timeframe of each of the plurality of interdependent map portions; quality of each of the plurality of interdependent map portions; overlap of scenes viewed by an image sensor; overlap of map data; semantic data; aerial view of the geographic information; system confidence values; or overlap of nearby structures.

12. The method of claim 1, wherein the at least one group of interdependent map portions for semi-automatic validation or manual validation is output to one or more manual validation systems.

13. A method comprising:
   receiving at least one group of interdependent map portions that corresponds with a trajectory, the group of interdependent map portions comprising:
      at least one interdependent map portion that requires validation; and
      at least one additional interdependent map portion that has been previously verified;
   displaying the at least one group of interdependent map portions for validation; and
   receiving one or more validation adjustments to the at least one group of interdependent map portion that requires validation, wherein the one or more validation adjustments are based on an overlap of data between the interdependent map portions of the group.

14. The method of claim 13, wherein the at least one group of interdependent map portions comprises a plurality of image data;
   further wherein the plurality of image data comprises at least a pose of each of the plurality of image data.

15. The method of claim 14, further comprising revalidating the validated map portions.

16. The method of claim 13, wherein the one or more validation adjustments comprises at least one of: a set of guidelines; a set of instructions; one or more plug-ins for data curation; or one or more tools for data input.

17. The method of claim 13, wherein the one or more validation adjustments further comprises at least one of: manual validation; automatic validation; or semi-automatic validation.

18. The method of claim 13, wherein the one or more validation adjustments comprise at least one of:
   navigating a geographical area corresponding to the at least one group of interdependent map portion that requires validation in a three-dimension space;
   hiding or showing different displayed elements associated with a geographical area corresponding to the at least one group of interdependent map portion that requires validation;
   using predetermined validation shortcuts; a confidence color scheme;
   highlight one or more interdependent portions; changing resolution; or
   using augmented reality or virtual reality.

19. The method of claim 13, wherein the one or more validation adjustments comprises at least one of:
  visual manipulation;
  reviewing the plurality of grouped interdependent map portions from a different perspective;
  determining abnormalities;
  determining alignments;
  determining misalignments;
  inputting one or more annotations;
  selecting one or more of each of the plurality of grouped interdependent map portions;
  de-selecting one or more of each of the plurality of grouped interdependent map portions;
  removing one or more of each of the plurality of grouped interdependent map portions;
  re-embedding one or more of each of the plurality of grouped interdependent map portions;
  hiding one or more of each of the plurality of grouped interdependent map portions;
  exposing one or more of each of the plurality of grouped interdependent map portions;
  enlargement of one or more of each of the plurality of grouped interdependent map portions; or
  diminution of one or more of each of the plurality of grouped interdependent map portions.

20. A method comprising:
  receiving at least one group of interdependent map portions that corresponds with a trajectory, wherein the at least one group of interdependent map portions comprises a plurality of interdependent map portions generated from the global map, the group of interdependent map portions comprising:
    at least one interdependent map portion that requires validation; and
    at least one additional interdependent map portion that has been previously verified;
  wherein validating the map portions of the at least one group of interdependent map portions is based on an overlap of data between the interdependent map portions of the group;
  receiving one or more validation adjustments corresponding to the at least one group of interdependent map portions; and
  updating the global map with the at least one group of interdependent map portions with the validated map portions.

21. The method of claim 20, wherein the at least one validated interdependent map portion comprises at least one of: adding or removing one or more map label data; amending position; amending orientation; amending structure; revising semantic meaning; revising semantic context; deleting sections; or revising geographic location.

* * * * *